United States Patent
Modarresi

(10) Patent No.: US 10,037,417 B1
(45) Date of Patent: Jul. 31, 2018

(54) TRANSFORMATION OF NETWORK ACTIVITY DATA FOR USER IDENTIFICATION

(71) Applicant: Adobe Systems Incorporated, San Jose, CA (US)

(72) Inventor: Kourosh Modarresi, Santa Clara, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 15/727,094

(22) Filed: Oct. 6, 2017

(51) Int. Cl.
*H04L 29/06* (2006.01)
*G06F 21/31* (2013.01)
*G06F 17/16* (2006.01)
*G06F 17/30* (2006.01)

(52) U.S. Cl.
CPC .......... *G06F 21/316* (2013.01); *G06F 17/16* (2013.01); *G06F 17/30324* (2013.01); *G06F 17/30327* (2013.01); *H04L 63/08* (2013.01)

(58) Field of Classification Search
CPC .. G06F 21/316; G06F 17/16; G06F 17/30324; G06F 17/30327; G06F 21/31; H04L 63/08
USPC .......................................... 726/2–7; 713/168
See application file for complete search history.

(56) References Cited

U.S. PATENT DOCUMENTS

| | | | |
|---|---|---|---|
| 6,134,532 A | 10/2000 | Lazarus et al. | |
| 6,452,925 B1 * | 9/2002 | Sistanizadeh | H04L 12/2856 370/352 |
| 7,092,926 B2 | 8/2006 | Cerrato | |
| 7,409,705 B2 * | 8/2008 | Ueda | G06F 21/36 382/115 |
| 7,721,336 B1 * | 5/2010 | Adjaoute | G06Q 20/04 379/145 |
| 7,792,894 B1 * | 9/2010 | Cohn | G06F 17/16 708/405 |
| 8,108,406 B2 | 1/2012 | Kenedy et al. | |
| 9,280,643 B2 * | 3/2016 | Zhang | G06F 21/00 |

* cited by examiner

*Primary Examiner* — Hosuk Song
(74) *Attorney, Agent, or Firm* — Brake Hughes Bellermann LLP

(57) ABSTRACT

Techniques of identifying users involve automatically determining whether new user activity data received by a server is associated with a user known to the server. Along these lines, a server collects data representing network activity of a group of users. The data collected takes the form of a table, or matrix, with each entry corresponding to a respective user and having values of a respective set of fields. The server may then use this data as training data in developing a model for predicting whether new activity data corresponds to one of the group of users or a new user not in the group of users.

20 Claims, 7 Drawing Sheets

| visitorId | event_list:Revenue | visit_num:Count | visit_num:Max | hit_time_gmt:AvgVisitTime | visit_num:AvgVisitLength | accept_language:MostFrequent |
|---|---|---|---|---|---|---|
| 1 | 0 | 8 | 1 | 1192 | 8 | en-us |
| 2 | 0 | 70 | 681 | 606 | 1 | en-us |
| 3 | 0 | 4 | 5 | 112 | 4 | en-us |
| 4 | 0 | 15 | 20 | 932 | 7 | en-us |
| 5 | 0 | 22 | 6 | 1939 | 7 | en-us |
| 6 | 0 | 7 | 1 | 953 | 7 | en-us |
| 7 | 0 | 4 | 7 | 37 | 1 | en-US,en;q=0.5 |
| 8 | 0 | 9 | 2 | 668 | 9 | en-us |
| 9 | 0 | 5 | 1 | 480 | 5 | en-us |
| 10 | 0 | 25 | 20 | 608 | 2 | en-us |
| 11 | 0 | 5 | 1 | 475 | 5 | en-us |
| 12 | 0 | 8 | 1 | 1320 | 8 | en-us |
| 13 | 0 | 5 | 3 | 28 | 5 | en-us |
| 14 | 0 | 4 | 18 | 0 | 1 | en-us |
| 15 | 0 | 17 | 5 | 1165 | 5 | en-us |
| 16 | 0 | 12 | 159 | 1022 | 1 | en-us |
| 17 | 0 | 4 | 1 | 32 | 4 | en-CA |
| 18 | 0 | 6 | 2 | 746 | 6 | en-us |
| 19 | 0 | 6 | 7 | 428 | 6 | en-us |
| 20 | 0 | 5 | 100 | 0 | 1 | en-us |
| 21 | 0 | 4 | 49 | 327 | 4 | en-us |
| 22 | 0 | 30 | 1 | 1359 | 30 | en-US,en;q=0.8 |
| 23 | 0 | 5 | 61 | 0 | 1 | en-us |
| 24 | 0 | 8 | 1 | 2277 | 8 | en-us |
| 25 | 0 | 6 | 1 | 126 | 6 | sv,en-US;q=0.8 |
| 26 | 0 | 4 | 1 | 650 | 4 | en-us |
| 27 | 0 | 5 | 5 | 0 | 1 | en-us |
| 28 | 0 | 4 | 2 | 341 | 2 | en-us |

FIG. 7

TRANSFORMATION OF NETWORK ACTIVITY DATA FOR USER IDENTIFICATION

TECHNICAL FIELD

This description relates to identifying unique users in a network.

BACKGROUND

A conventional approach to identifying users in an electronic network involves using tracking information such as Internet Protocol (IP) addresses and tracking cookies. For example, a web server hosting a web site may identify a user based on an IP address from which the user has attempted to access the web site. In this way, the web server may grant the user access to the web site based on the IP address, thereby simplifying the access granting process. Alternatively, such a web server may use tracking cookies that identify a user attempting to access the web site from different access points.

SUMMARY

In one general aspect, a method can include obtaining, by processing circuitry of a server computer configured to identify new users in a network, an initial user activity matrix, the initial user activity matrix having entries identifying a plurality of users, each of the entries having values of a respective, initial plurality of fields representing activity of a corresponding user of the plurality of users in the network, the initial user activity matrix representing training data in which each entry includes an identity of a user of the plurality of users. The method can also include performing, by the processing circuitry, a transformation operation on the initial user activity matrix to produce a user activity matrix, the user activity matrix having values of a plurality of fields, the values of the plurality of fields including the values of the initial plurality of fields and values of a plurality of additional fields, the values of the plurality of additional fields being based on an application of a model of the values of the initial plurality of fields. The method can further include receiving, by the processing circuitry, a new user activity entry representing activity of a new user in the network, the user activity entry having values of the initial plurality of fields. The method can further include applying, by the processing circuitry, the model to the new user activity entry to produce a predicted new user activity entry. The method can further include performing, by the processing circuitry, a comparison operation on the predicted new user activity entry and the user activity matrix to produce a comparison result, the comparison result indicating whether the new user is a user of the plurality of users.

The details of one or more implementations are set forth in the accompanying drawings and the description below. Other features will be apparent from the description and drawings, and from the claims.

BRIEF DESCRIPTION OF THE DRAWINGS

FIG. 7 is a diagram that illustrates an example user activity account record according to the improved techniques shown in FIG. 1.

DETAILED DESCRIPTION

Figure 1:
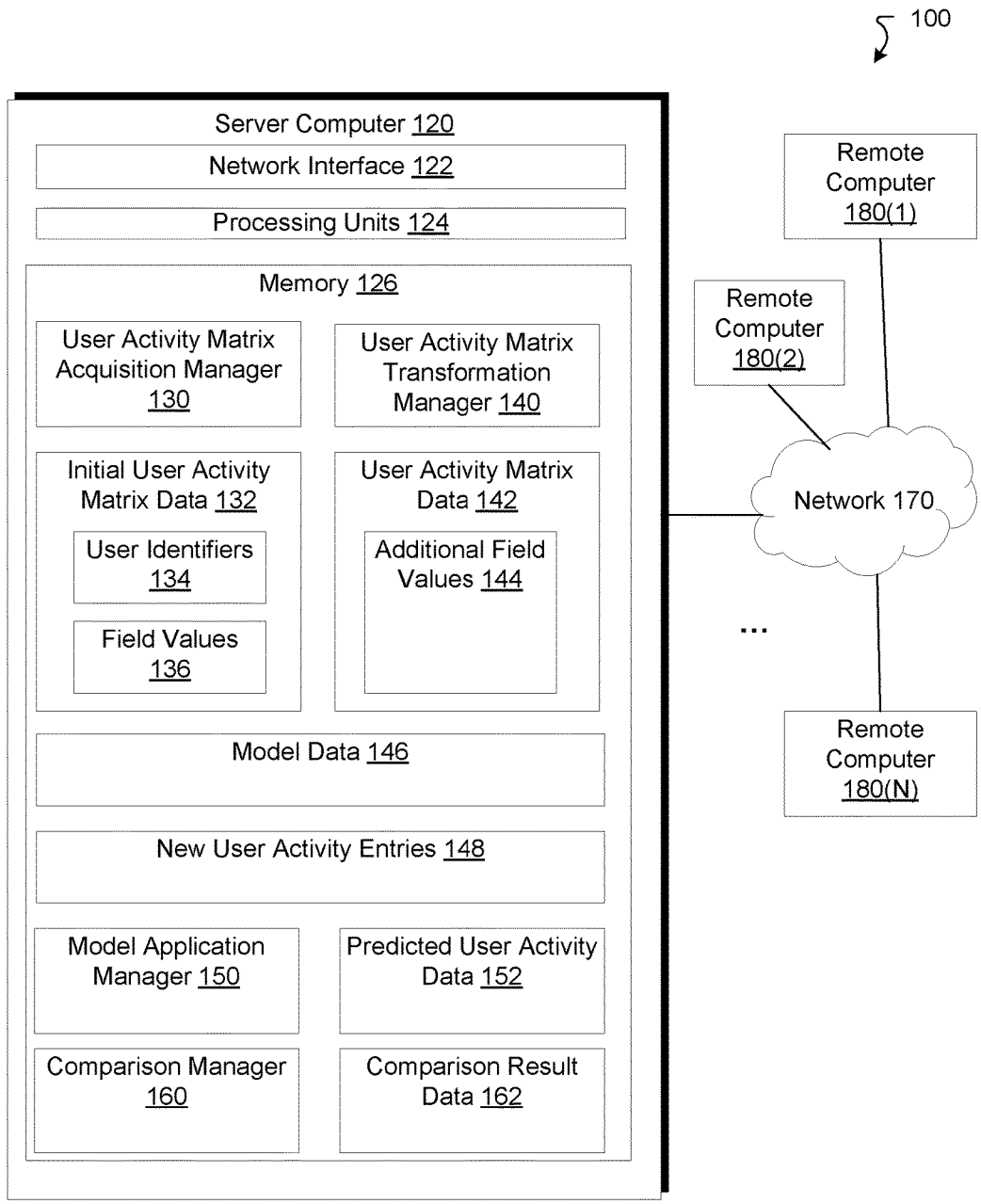
FIG. 1 is a diagram that illustrates an example electronic environment in which improved techniques described herein may be implemented.

The above-described conventional approaches to identifying users may be unreliable in some circumstances. For example, a user may use several IP addresses, and some of those IP addresses may change from device to device. Along these lines, suppose a user logs into a website from a laptop, a tablet computer, and a smartphone. Even if the user attempted to log into the website from each of these locations on the same wireless network, the IP address of each device would be different. Further, there is no guarantee that the user is the only one that has logged into the website from that IP address. Nevertheless, a more likely scenario is that the user may attempt to log into the website from arbitrary locations, and these locations would present new IP addresses to the web site. Accordingly, it would be difficult for a web server that identifies users by known IP addresses to identify such a user from a mobile device.

Alternatively, web servers may provide tracking cookies to associate a device with a known user. A tracking cookie is a small text file that includes details of login parameters, browsing history, and preferences when using the web site. Such tracking cookies avoid some of the problems with using IP addresses because of the additional details that provide identifying information to the web site that may be located on any device. Nevertheless, because tracking cookies are text files, users can delete tracking cookies. Further, such tracking cookies still may not solve the problem of identifying as a unique user a user employing different electronic devices, venues, and channels.

Even when not deleted by users, tracking cookies pose privacy issues. Tracking cookies may use personal data such as identifying information (e.g., account numbers) and location information over time. The use of such information is understandably not attractive to users and may diminish from the experience of using a website.

In some cases, user identification may rely on user account identifiers such as user ID and/or email address. This method may also be unreliable as a single user may have many email and multiple accounts. At the same time, multiple users may use the same account and/or email. Again, privacy concerns make using account credentials and email addresses unattractive for the purpose of identifying users.

In accordance with the implementations described herein and in contrast to the above-described approaches to identifying users, improved techniques of identifying users involve automatically determining whether new user activity data received by a server is associated with a user known to the server. Along these lines, a server collects data representing network activity of a group of users. The data collected takes the form of a table, or matrix, with each entry corresponding to a respective user and having values of a respective set of fields. The server may then use this data as training data in developing a model for predicting whether new activity data corresponds to one of the group of users or a new user not in the group of users.

In some implementations, examples of fields include a number of sessions to a website hosted by the server in a 30-day period, an average length of visits in the 30-day period, an average number of mouse clicks per session in the 30-day period, and an average time between mouse clicks per session in the 30-day period. Such field values are based on user behavior rather than user identity. The use of such field values accordingly maintains user privacy.

In some implementations, the training data has missing values of some of the fields in some of the entries. In this case, the model developed from the training data generates predicted values of such fields in those entries. In some implementations, the model takes the form of output from a random forest of classification and regression trees (CARTs). Along these lines, the server generates each of the CARTs from a bootstrap sample without replacement of the values of the fields of the training data. The output of each CART is the most probable value of the missing value of a field given the values of the other fields. The missing value of the field is, in some implementations, an average of the outputs of each CART.

In some implementations, the training data does not have enough fields to provide predictive capability for determining whether new activity data is associated with a user already associated with the training data. In this case, the model developed from the training data generates additional fields based on the values of the fields of the training data. These additional fields have values that correlate well with the values of the existing fields of the training data. The values of the additional fields are based on parameter values, as well as the number of additional fields, that are found by comparing a measure of prediction error in the training data to an error threshold.

In some implementations, the number of fields needed to provide such predictive capability may overwhelm computing resources due to the curse of dimensionality. In this case, a comparison between new activity data and entries of the training data involves a dimension reduction. In some implementations, such a dimension reduction includes a compact singular value decomposition (SVD) of a user activity matrix containing the training data. Such a compact SVD produces singular values a pair of projection matrices such that the product of each of the projection matrices and a diagonal matrix made up of the singular values is an optimal approximation to the user activity matrix. The number of columns of each of the projection matrices may be vastly smaller than the number of columns of the user activity matrix. When the server receives new activity data, the server applies the model to generate predicted values of the additional fields and/or missing field values to produce predicted user activity data. The server then projects the predicted user activity data onto the first projection matrix to produce a projected user activity array. The server then determines whether the user activity data is associated with a new user by generating a relative error between the projected user activity array and each row of the second projection matrix.

Such improved techniques provide a way to uniquely identify users while respecting users' privacy. Along these lines, the user activity records do not contain personally identifiable information. Rather, the user activity data describes user behavior. Accordingly, even though the server is configured to determine unique users from the user activity records, the web server does not use personally identifiable information in doing so. Further, the improved techniques provide improved reliability in uniquely identifying users because the identification is based on user behavior.

FIG. 1 is a diagram that illustrates an example electronic environment 100 in which the above-described improved techniques may be implemented. As shown, in FIG. 1, the electronic environment 100 includes a server computer 120, a network 170, and remote computers 180(1), . . . , 180(N).

The server computer 120 is configured to identify new users in the network 170. The server computer 120 includes a network interface 122, one or more processing units 124, and memory 126. The network interface 122 includes, for example, Ethernet adaptors, Token Ring adaptors, and the like, for converting electronic and/or optical signals received from a network to electronic form for use by the server computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the server computer 120 can be, or can include processors (e.g., processing units 124) configured to process instructions stored in the memory 126. Examples of such instructions as depicted in FIG. 1 include a user activity matrix acquisition manager 130, a user activity matrix transformation manager 140, a model application manager 150, and a comparison manager 160. Further, as illustrated in FIG. 1, the memory 126 is configured to store various data, which is described with respect to the respective managers that use such data.

The user activity matrix acquisition manager 130 is configured to obtain initial user activity matrix data 132 from sources on the network 170. For example, the user activity matrix acquisition manager 130 collects information whenever a remote computer, e.g., remote computer 180(1) accesses the server computer 120 via the network 170. Examples of such information may include some or all of a number of sessions over a specified period of time, an average number of clicks during a session, an average length of a session, and an average length of time per click during a session.

The initial user activity matrix data 132 include a plurality of entries, each entry corresponding to user identifier 134 and having values of fields 136 describing the collected information. In some implementations, each entry has values 136 of only a subset of the fields. For example, a first entry may only have values 136 of a number of sessions over a period of time and an average length of a session, while a second entry has values 136 of those fields as well as an average number of clicks during a session.

The user activity matrix transformation manager 140 is configured to generate additional field values 144 from the initial user activity matrix data 132 to produce user activity matrix data 142 representing a user activity matrix. The user activity matrix data 142 includes a sufficient number of fields and field values such that the server computer 120 may correctly predict the identity of a user associated with an entry of a user activity matrix containing the additional field values 144.

In the following discussion, the initial user activity matrix data 132 and the user activity matrix each have rows that are the entries of the initial user activity matrix data 132 and the columns of the matrix are the field values 136 including the additional field values 142.

In some implementations, the user activity matrix transformation manager 140 generates the user activity matrix by creating additional fields based on a model defined by model data 146. In some implementations, the user activity matrix transformation manager 140 creates such additional fields having values 144 equal to a weighted average of the field values 136. Along these lines, suppose that the matrix representing the initial user activity matrix data 132 is denoted as $X_0$ and having n columns $x_i$, $i \in \{1 \ldots n\}$. The column $x_i$ represents the value of the $i^{th}$ field in the records 132. In such a case, the model data 146 includes weights $a_i^{(w)}$, where $w \in \{n+1 \ldots n+p\}$ and p is the number of additional fields.

Figure 5:
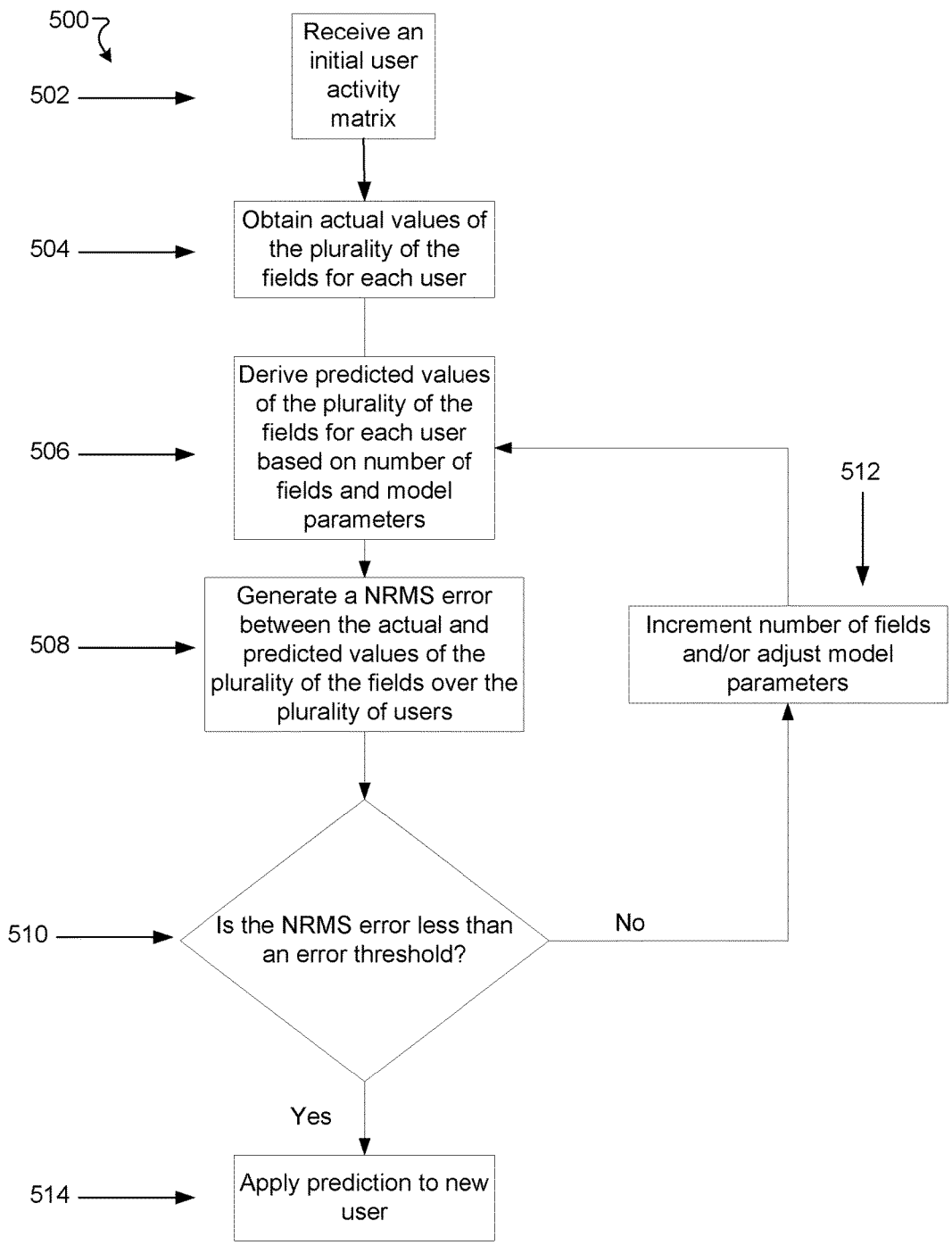
FIG. 5 is a flow chart that illustrates an example process of determining a model for predicting whether a new user is a known user according to the improved techniques shown in FIG. 1.

In some implementations, the user activity matrix transformation manager 140 determines the model data 146 iteratively. Along these lines, the user activity matrix transformation manager 140 begins with p=1 and forms the new column in the matrix according to a weighted average of the existing columns of the initial user activity matrix data 132 $x_i$, $i \in \{1 \ldots n\}$ as follows:

$$x_w = \sum_{i=1}^{w-1} (a_i^{(w)} x_i + \varepsilon_i^{(w)}),$$

where w=n+1 and $\varepsilon_i^{(w)}$ is a zero-mean, noise term, i.e. standard Gaussian noise. This weighted average produces predicted entries of the user activity matrix 142. The user activity matrix transformation manager 140 determines the weights $a_i^{(w)}$ using a gradient descent process on an error between these predicted entries and actual entries retrieved from memory 126. If the minimum of this error is less than some specified tolerance α then only the one additional field is sufficient. Otherwise, the user activity matrix transformation manager 140 adds another additional field 144 and increments p and repeats the above-described process until the error is less than α. In this way, the user activity matrix transformation manager 140 determines the number of additional fields p as well as the weights $a_i^{(w)}$ as the model data 156. Further details of this process are shown in FIG. 5.

As disclosed above, in some implementations not all rows of the initial user activity matrix data 132 $X_0$ do not have values for all of the fields, i.e., some elements of the initial user activity matrix $X_0$ do not have defined values. In this case, the user activity matrix transformation manager 140 is configured to identify an element of the matrix $X_0$ that does not have a defined value, and then perform a field value filling operation to produce a derived value of the identified element. In some implementations, the derived value is based on a likelihood that the field corresponding to the element's column takes the derived value for the entry corresponding to the element's row.

In some implementations, the field value filling operation includes a machine learning operation. Along these lines, a value of one field for one user may be determined based on values of other fields for other users depending on a similarity between the users and the fields. In some implementations, such a similarity is established through the training data. It is through such data that the user activity matrix transformation manager 140 may generate probabilities that a field may take a particular value given other fields taking other values.

In some implementations, a machine learning process that is configured to generate field values takes the form of a classification and regression tree (CART). It has been observed that the output of a single CART can be overly sensitive to values of a particular field. Accordingly, in some implementations, the user activity matrix transformation manager 140 uses a random forest of CARTs to output the field value. Such a random forest is disclosed in further detail with regard to FIG. 6.

Once the user activity table generation manager 140 has provided enough fields and respective values to determine which rows (i.e., users) correspond to unique users, the server computer 120 is ready to determine whether a new user activity entry 148 corresponds to a new user or an existing user. Along these lines, the user activity matrix acquisition manager 130 is configured to obtain new user activity entries 150 from sources 180(1) . . . 180(N) on the network 170.

The model application manager 150 is configured to apply the model defined by the model data 146 determined as described above to a new user activity entry 148 to produce predicted user activity data 152. The predicted user activity data 152 has values of the fields and additional fields according to the weighted average determined above as well as the random forest described above.

The comparison manager 160 is configured to perform a comparison operation to produce a comparison result 162. The comparison result 162 indicates whether the user corresponding to a new user activity entry 150 corresponds to one of the existing users corresponding to rows of the user activity matrix X. In some implementations, the comparison manager 160 is configured to form a magnitude of a difference between a vector representing a new user activity entry 150 and each of the rows of the matrix X to form a relative error vector. In this case, if the minimum of the relative error vector is less than some specified tolerance, then the new user activity entry 150 is associated with an existing user. Further details of such a comparison are disclosed with regard to FIG. 6.

Frequently, the comparison manager 160 performs the comparison operation many times. When there are a large number of fields, each comparison operation may involve a heavy computational load and occupy an excessive amount of time. In an environment involving access to a web site, such an excessive amount of time is unacceptable. Accordingly, in some arrangements, the comparison manager 160 is configured to perform a dimension reduction operation to replace the matrix X with a compact approximation of lower dimension (i.e., fewer columns) so that the resulting comparison operation may be performed much more quickly.

In some implementations, the comparison manager 160 performs a compact singular value decomposition (SVD) on the matrix X to produce a pair of initial projection matrices U and V and singular values D. The compact SVD involves removing columns of the projection matrices U and V according to the singular values D. In such a case, the comparison manager 160 projects the vector representing a new user activity entry 148 onto one of the projection matrices to produce a projected vector. The comparison manager 160 is then configured to perform the comparison operation between the projected vector and each row of the other projection vector. Further details of this operation are described with regard to FIGS. 3 and 4.

The network 170 is configured and arranged to provide network connections between the server computer 120 and the remote computers 180(1), . . . , 180(N) that may access the website. The network 170 may implement any of a variety of protocols and topologies that are in common use for communication over the Internet or other networks. Further, the network 170 may include various components (e.g., cables, switches/routers, gateways/bridges, etc.) that are used in such communications.

The components (e.g., modules, processing units 124) of the server computer 120 can be configured to operate based on one or more platforms (e.g., one or more similar or different platforms) that can include one or more types of hardware, software, firmware, operating systems, runtime libraries, and/or so forth. In some implementations, the components of the server computer 120 can be configured to operate within a cluster of devices (e.g., a server farm). In such an implementation, the functionality and processing of the components of the Server computer 120 can be distributed to several devices of the cluster of devices.

The components of the server computer 120 can be, or can include, any type of hardware and/or software configured to process attributes. In some implementations, one or more portions of the components shown in the components of the server computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the server computer 120 can be, or can include, a software module configured for execution by at least one processor (not shown). In some implementations, the functionality of the components can be included in different modules and/or different components than those shown in FIG. 1.

Although not shown, in some implementations, the components of the user device 120 (or portions thereof) can be configured to operate within, for example, a data center (e.g., a cloud computing environment), a computer system, one or more server/host devices, and/or so forth. In some implementations, the components of the server computer 120 (or portions thereof) can be configured to operate within a network. Thus, the components of the server computer 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the server computer 120 can be, or can include, processors configured to process instructions stored in a memory. For example, a user activity matrix acquisition manager 130 (and/or a portion thereof), a user activity matrix transformation manager 140 (and/or a portion thereof), a model application manager 150 (and/or a portion thereof), and a comparison manager 160 (and/or a portion thereof) can be a combination of a processor and a memory configured to execute instructions related to a process to implement one or more functions.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the server computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the server computer 120. As illustrated in FIG. 1, the memory 126 is configured to store various data, including initial user activity matrix data 132, which in turn includes account identifiers 134 and field values 136; a user activity table 142, including field values 144, new user activity entries 148, predicted user activity data 152, and comparison result data 162.

Figure 2:
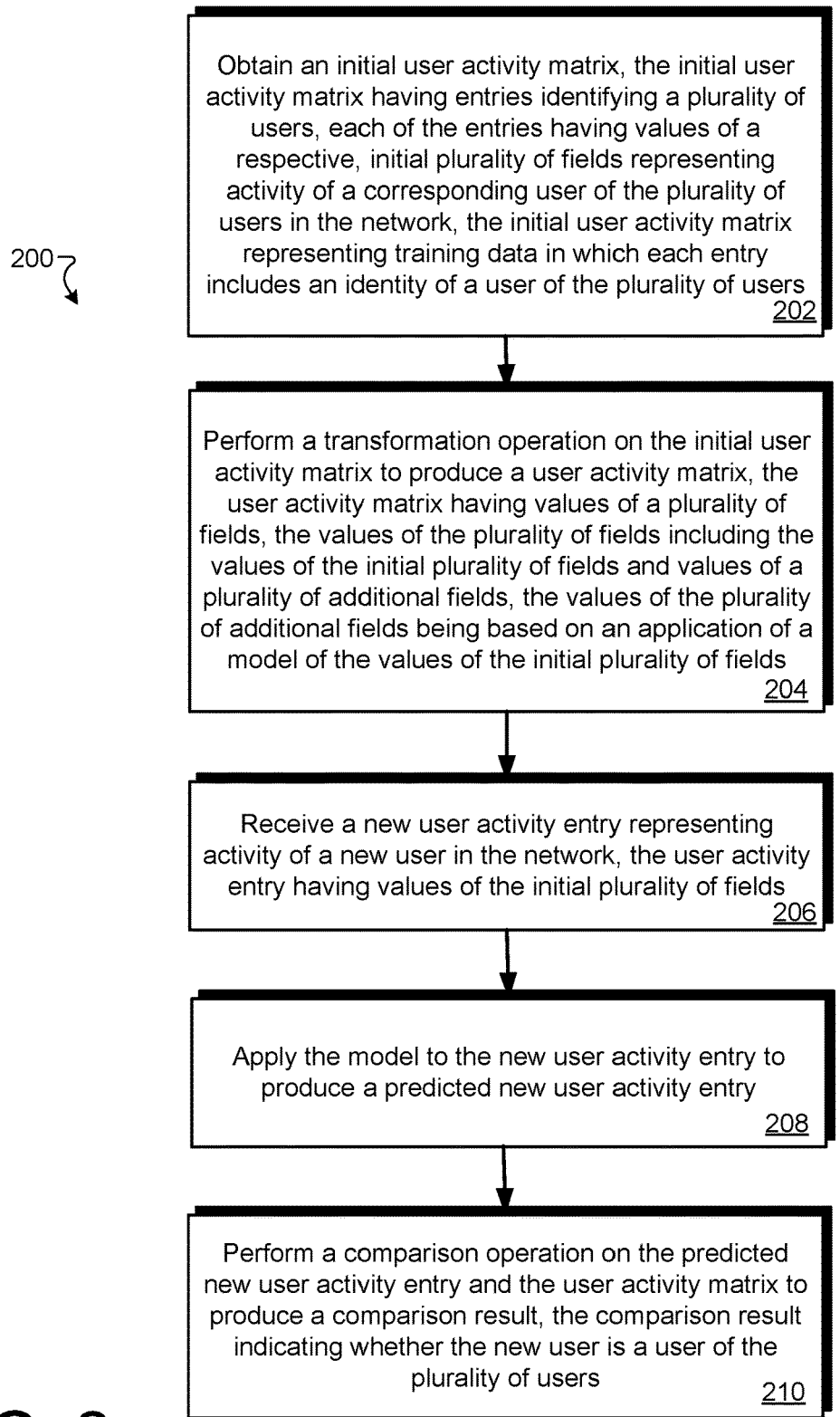
FIG. 2 is a flow chart that illustrates an example method of implementing the improved techniques as shown in FIG. 1.

FIG. 2 is a flow chart depicting an example method 200 of identifying unique users in a network. The method 200 may be performed by software constructs described in connection with FIG. 1, which reside in memory 126 of the server computer 120 and are run by the set of processing units 124.

At 202, the server computer 120 (FIG. 1) obtains an initial user activity matrix. The initial user activity matrix has entries identifying a plurality of users. Each of the entries has values of a respective, initial plurality of fields representing activity of a corresponding user of the plurality of users in the network. The initial user activity matrix represents training data in which each entry includes an identity of a user of the plurality of users.

At 204, the server computer 120 performs a transformation operation on the initial user activity matrix to produce a user activity matrix. The user activity matrix has values of a plurality of fields, the values of the plurality of fields including the values of the initial plurality of fields and values of a plurality of additional fields. The values of the plurality of additional fields are based on an application of a model of the values of the initial plurality of fields.

At 206, the server computer 120 receives a new user activity entry representing activity of a new user in the network. The user activity entry has values of the initial plurality of fields.

At 208, the server computer 120 applies the model to the new user activity entry to produce a predicted new user activity entry.

At 210, the server computer 120 performs a comparison operation on the predicted new user activity entry and the user activity matrix to produce a comparison result. The comparison result indicates whether the new user is a user of the plurality of users.

Figure 3:
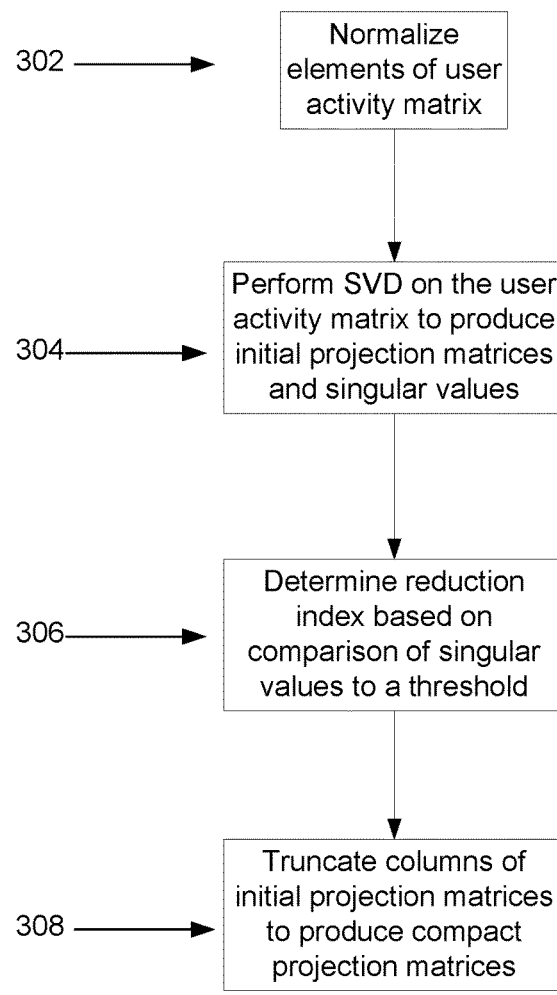
FIG. 3 is a diagram that illustrates an example process of reducing the dimensionality of a user activity matrix according to the improved techniques shown in FIG. 1.

FIG. 3 is a flow chart illustrating an example process 300 of performing a compact SVD of the user activity matrix for dimensionality reduction. The process 300 may be performed by software constructs described in connection with FIG. 1, which reside in memory 126 of the server computer 120 and are run by the set of processing units 124.

At 302, the server computer 120 normalizes elements of the user activity matrix X. In some implementations, such a normalization involves determining a mean value $\mu_t$ and standard deviation $\sigma_i$ of each of the fields. The normalization of the values of the $i^{th}$ field $x_i$ then takes the form $$\tilde{x}_i = \frac{x_i - \mu_i}{\sigma_i}.$$

At 304, the server computer 120 performs a singular value decomposition (SVD) of the normalized user activity matrix $\tilde{X}$ to produce a first projection matrix U, a second projection matrix V, and singular values D. That is, the SVD of the normalized user activity matrix $\tilde{X}$ produces the factorization $\tilde{X}=UDV^T$. Note that when there are M users and N=n+p fields, the first projection matrix U is a M×M matrix, the second projection matrix V is a N×N matrix, and the singular values are diagonals of the M×N matrix D.

At 306, the server computer 120 determines a reduction index R by which to reduce the dimensionality of the projection matrices based on a comparison of the singular values to a threshold. Along these lines, each of the singular values represents a relative "intensity," or importance of a field to the determination of an identity of a new user based on user activity data. The normalization of the field values ensures that the optimal amount of information according to some determined threshold β corresponding to the data matrix X is preserved. That information is equivalent to the amount of preserved variation of the data matrix X. This is done by keeping the first R singular values and the corresponding left and right singular vectors (U and V), such that the summation of these R singular values divided by the summation of all of the singular values is equal or greater than the threshold β: as in $$\frac{\sum_{j=1}^{R} d_j}{\sum_{i=1}^{n+p} d_i} \geq \beta$$

The threshold β is between 0 and 1. $d_j$ is the j-th corresponding singular value of the data matrix X.

Generally, the SVD arranges the singular values in decreasing order so that the reduction index refers to the first R singular values and, accordingly, the first R columns of each of the projection matrices U and V.

At 308, the server computer 120 truncates each of the projection matrices U and V according to the reduction index R to produce respective compact projection matrices $\tilde{U}$ and $\tilde{V}$. The compact projection matrix $\tilde{U}$ is now a rectangular matrix having dimensions M×R, the compact projection matrix $\tilde{V}$ is now a rectangular matrix having dimensions N×R, and a compact singular value matrix having the selected singular values on the diagonals is a square matrix of dimension R×R. According to the Eckart-Young-Mirsky theorem, the factorization $\overline{X}=\tilde{U}\tilde{D}\tilde{V}^T$ (which has dimension M×N) has a difference from the normalized user activity matrix $\tilde{X}$ having the smallest Frobenius norm.

Figure 4:
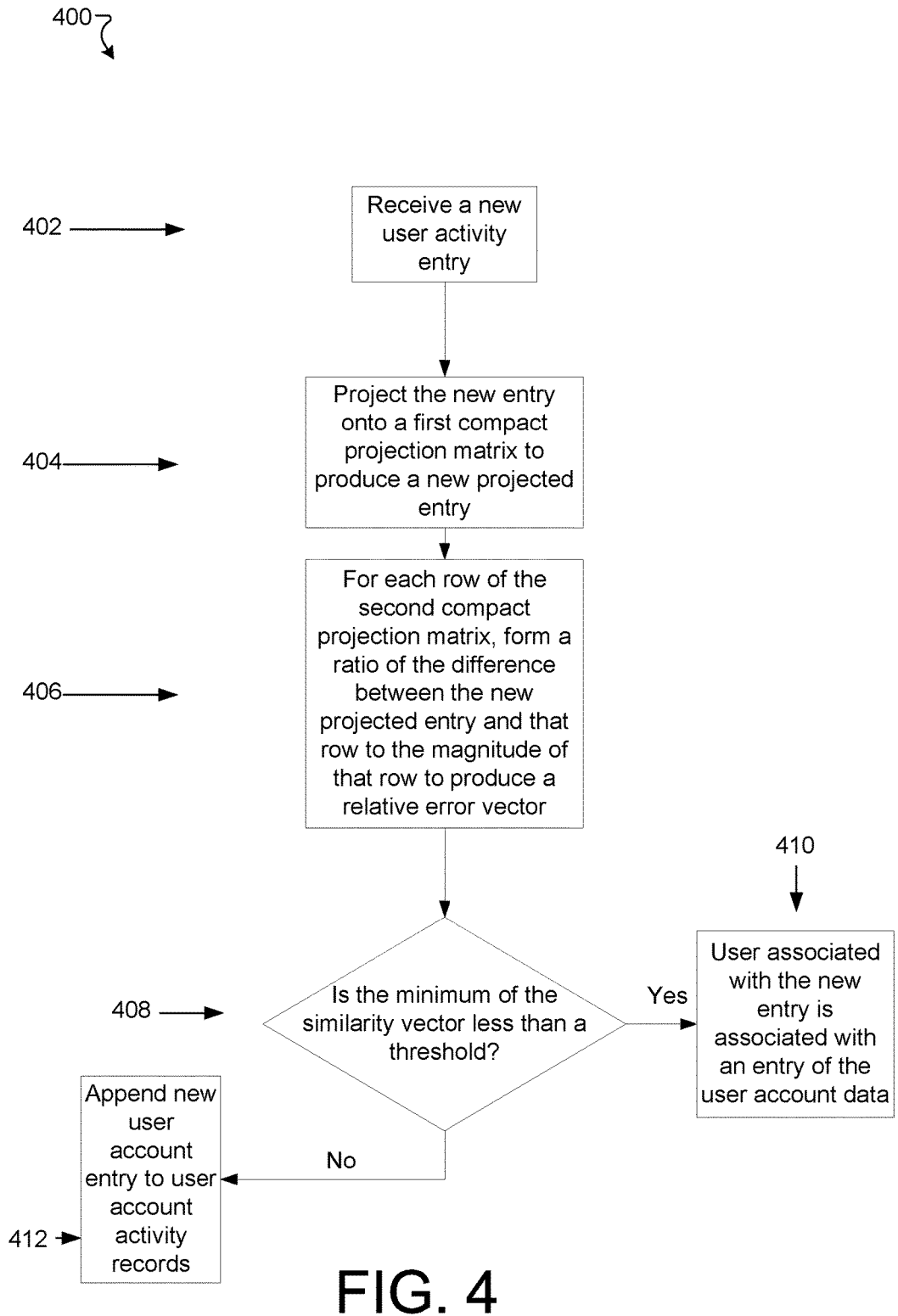
FIG. 4 is a flow chart that illustrates an example process of determining whether a new account activity entry corresponds to a new user according to the improved techniques shown in FIG. 1.

FIG. 4 is a flow chart illustrating a process 400 of determining whether new user activity data is associated with a user known to the server computer 120. The process 400 may be performed by software constructs described in connection with FIG. 1, which reside in memory 126 of the server computer 120 and are run by the set of processing units 124.

At 402, the server computer 120 receives a new user activity entry (e.g., new user activity entry 148) $x_{new}$ over the network 170. The server computer 120, upon receiving the new user activity entry $x_{new}$, applies the model defined by the model data 146 to the new user activity entry to produce a predicted user activity entry $x_{pred}$. Note that the new user activity entry $x_{new}$ has n fields, while the predicted user activity entry $x_{pred}$ has N=n+p fields. The other p fields may be determined as described previously. Also, the possible missing entries of $x_{pred}$ may be computed using a random forest as described previously.

At 404, the server computer 120 projects the predicted user activity entry $x_{pred}$ onto the compact projection matrix $\tilde{V}$ (which has dimensions N×R) to produce a new projected activity entry $u_{proj}$ having R fields. That is, $u_{proj}=x_{pred}\tilde{V}$.

At 406, the server computer 120 generates a relative error ϵ between the new projected activity entry $u_{proj}$ and each row of the compact projection matrix U. (Recall that the compact projection matrix U has dimension M×R, so that the relative error has M entries as expected.) In some implementations, the relative error is based on a Frobenius norm. Mathematically, this takes the form $$\varepsilon_m = \frac{\|u_m - u_{proj}\|}{\|u_m\|},$$

where $\epsilon_m$ is a relative dissimilarity between the new user projection ($u_{proj}$) to the $m^{th}$ existing user in the user activity matrix X represented by its projection $u_m$, where $u_m$ is the $m^{th}$ entry of the compact projection matrix $\tilde{U}$, and $\|\cdot\|$ denotes the Frobenius norm.

At 408, the server computer 120 evaluates whether the entry of the relative error ϵ having the minimum value is less than a threshold τ.

At 410, in response to the entry of the relative error ϵ having the minimum value being less than the threshold τ, the user computer 120 determines which of the known users is the user associated with the new user activity entry. If there is at least one entry of ϵ that has the value less than a threshold τ, then the new user is actually one of the existing user and will be identified as the user $u_t$ corresponding to the smallest entry of ϵ.

At 412, in response to the entry of the relative error ϵ having the minimum value being greater than the threshold τ, the user computer 120 appends the new user activity entry to the user activity matrix X, as the user associated with the new user activity entry is not one of the known users.

FIG. 5 is a flow chart illustrating an example process 500 of generating the model data 146 used to compute the predicted user activity entry $x_{pred}$. The process 500 may be performed by software constructs described in connection with FIG. 1, which reside in memory 126 of the server computer 120 and are run by the set of processing units 124.

At 502, the server computer 120 receives the initial user activity matrix $X_0$ as described above with regard to FIG. 1 (initial user activity matrix data 132). Note that the initial user activity matrix $X_0$ represents training data for deriving the model data 146.

At 504, the server computer 120 obtains actual values of fields as part of the training data for deriving the model data 146.

At 506, at a specified number of additional fields p, the server computer 120 formulates predicted values of the additional field values for each entry (user). For example, when using a weighted average model, the server computer 120 predicts the additional field values using values of the weights $a_i^{(w)}$, where $w \in \{n+1 \ldots n+p\}$ and $i \in \{1 \ldots n\}$.

At 508, the server computer 120 generates a normalized root mean square error (NRMSE) between the predicted field values and the actual field values and minimizes the NRMSE ρ over weights $a_i^{(w)}$. In some implementations, the NRMSE has the form $$\rho = \frac{\sqrt{\frac{1}{M}\sum_{m=1}^{M}\|u_m - u_{actual,m}\|}}{\sqrt{\frac{1}{M}\sum_{m=1}^{M}\|u_m\|}},$$

where $u_{actual,m}$ is the $m^{th}$ entry of the projection of the matrix containing the actual field values onto the compact projection matrix $\tilde{V}$. In some implementations, the sums in the NRMSE are over the squares of the norms. In some implementations, the norms are Frobenius norms. In some implementations, the minimization of the NRMSE over the weights $a_i^{(w)}$ involves using a gradient descent algorithm.

At 510, the server computer 120 evaluates whether the NRMSE is less than an error threshold.

At 512, in response to the NRMSE being greater than the error threshold, the server computer 120 increments the number of additional fields p and repeats the minimization process at 506 and 508 over the weights $a_i^{(w)}$.

At 514, in response to the NRMSE being less than the error threshold, the server computer 120, the server computer 120 stores the weights $a_i^{(w)}$ and the number of additional fields p as the model data 146.

In some implementations, the above optimization process also involves determining a value of the reduction index k simultaneously with the weights $a_i^{(w)}$ and the number of additional fields p. This is an alternative to determining the reduction index k from the singular values as described above with regard to FIG. 4.

Figure 6:
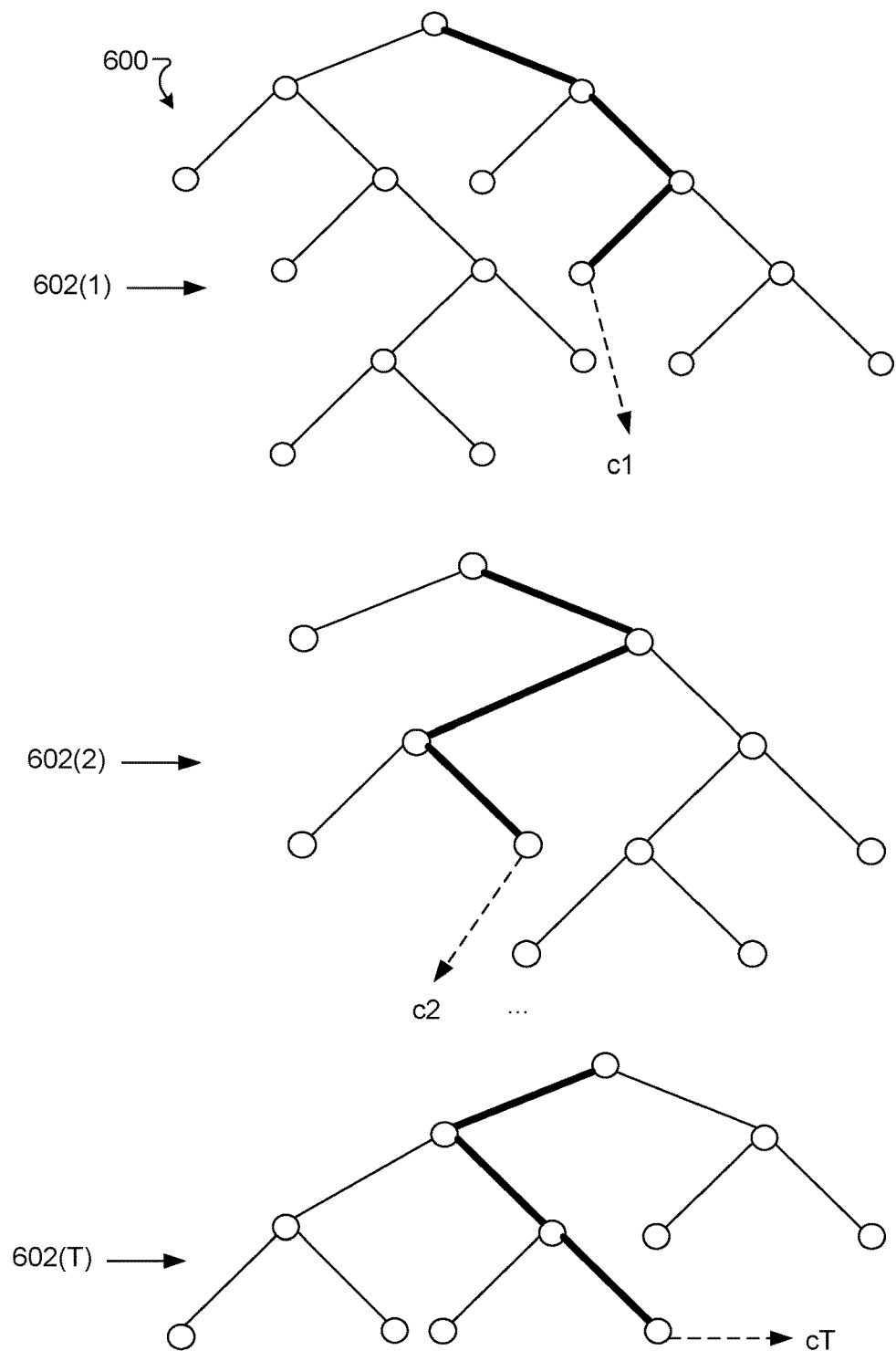
FIG. 6 is a diagram illustrating an example random forest used to determine most likely field values in a user activity table according to the improved techniques shown in FIG. 1.

FIG. 6 is a diagram illustrating an example random forest 600 of classification and regression trees (CARTs). as described above with regard to FIG. 1. The server computer 120 generates the random forest 600 in order to fill in missing field values in the initial user activity matrix $X_0$ or the user activity matrix X. Such missing field values can result from the fact that not every user has had values of certain fields recorded.

As part of a fill-in operation, the server computer 120 generates T CARTs 602(1), ..., 602(T) as the random forest. When there are S such similar values to be sampled, the server computer may sample $\lfloor\sqrt{S}\rfloor$ of the field values at random without replacement and a bootstrap sample of the users (with the same number m) with replacement to generate the random forest of CARTs. In some implementations, the server computer 120 breaks a range of possible missing field values into bins of subranges, or categories. The leaves of each CART represent a respective category of missing field values. Each node of each CART represents a known field value.

During operation, the server computer 120 traces a large number of paths for each CART to end up at one of the leaves of that CART. The category $c_k$ output from the $k^{th}$ CART corresponds to the leaf of that CART that is most often the endpoint of a path. The server computer 120 then translates each category back into a field value (e.g., the midpoint of a range represented by that category) and averages those values over all of the T CARTs to produce the missing value of the field.

FIG. 7 is a table illustrating an example initial user activity matrix $X_0$ 700. The matrix 700 has identifiers of unique users (1, 2, ..., 28) as well as values of various fields, e.g., Visit_num: Count, Visit_num:Max, hit_time_gmt:AvgVisitTime, Visit_num: AvgVisitLength, and accept_language:MostFrequent. Note that the last field is non-numerical.

In the table 700, there are a few missing values of the field hit_time_gmt:AvgVisitTime, shown as the value "0". In this case, the server computer may generate a random forest of CARTs as described with regard to FIG. 6 to fill in those missing values. Also, the server computer 120 may generate additional fields as described with regard to FIG. 5 to derive model data 146 for generating a model to determine whether new users may be identified as one of the users listed in the table 700.

One may note that the fields such as Visit_num:Max may pose a problem because of the wide range of values. That said, the server computer 120 may replace those field values with their normalized values. Also, in case of non-numerical fields, first they are converted to numerical or quantitative values and then normalized.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:

obtaining, by processing circuitry of a server computer configured to identify new users in a network, an initial user activity matrix, the initial user activity matrix having entries identifying a plurality of users, each of the entries having values of a respective, initial plurality of fields representing activity of a corresponding user of the plurality of users in the network, the initial user activity matrix representing training data in which each entry includes an identity of a user of the plurality of users;

performing, by the processing circuitry, a transformation operation on the initial user activity matrix to produce a user activity matrix, the user activity matrix having values of a plurality of fields, the values of the plurality of fields including the values of the initial plurality of fields and values of a plurality of additional fields, the values of the plurality of additional fields being based on an application of a model of the values of the initial plurality of fields;

receiving, by the processing circuitry, a new user activity entry representing activity of a new user in the network, the new user activity entry having values of the initial plurality of fields;

applying, by the processing circuitry, the model to the new user activity entry to produce a predicted new user activity entry; and performing, by the processing circuitry, a comparison operation on the predicted new user activity entry and the user activity matrix to produce a comparison result, the comparison result indicating whether the new user is a user of the plurality of users.

2. A method as in claim 1, further comprising:

performing a compact singular value decomposition (SVD) of the user activity matrix to produce a first projection matrix and a second projection matrix;

performing a new user activity projection operation on the predicted new user activity entry and the first matrix factor to produce a projected user activity entry; and performing, by the processing circuitry, a comparison operation on the projected user activity entry and each row of the second matrix factor to produce a comparison result, the comparison result indicating whether the new user is a user of the plurality of user.

3. The method as in claim 2, performing the compact SVD of the user activity matrix includes:

performing a SVD of the user activity matrix to produce a first initial projection matrix, a second initial projection matrix, and an initial plurality of singular values;

generating a number of the initial plurality of singular values greater than a specified threshold; and truncating a number of columns of the first initial projection matrix and the second initial projection matrix to produce, respectively, the first projection matrix and the second projection matrix, the number of columns of the first initial projection matrix and the second initial projection matrix truncated being equal to the number of the initial plurality of singular values greater than a specified threshold.

4. The method as in claim 1, wherein performing the comparison operation on the predicted new user activity entry and the user activity matrix includes:

generating a relative error between the predicted new user activity entry and each row of the second matrix factor to produce a relative error array;

in response to the element of the relative error array having the smallest value being less than a specified tolerance, indicating that the new user is a user of the plurality of users; and in response to the element of the relative error array having the smallest value being greater than the specified tolerance, indicating that the new user does is not a user of the set of users in the network.

5. The method as in claim 4, further comprising:

in response to the element of the relative error array having the smallest value being less than a specified tolerance, not appending the new user activity entry to the user activity matrix; and in response to the element of the relative error array having the smallest value being greater than the specified tolerance, appending the new user activity entry to the user activity matrix.

6. The method as in claim 1, wherein performing a transformation operation on the initial user activity matrix includes:

setting the user activity matrix to be the initial user activity matrix;

generating, as a new column of the user activity matrix, a weighted average of the columns of the user activity matrix, the model being based on weights of the weighted average; and appending the new column to the user activity matrix.

7. The method as in claim 6, wherein generating the weighted average of the columns of the user activity matrix includes:

adding a respective zero-mean, Gaussian-distributed random value to each term of the weighted average.

8. The method as in claim 1, wherein performing the transformation operation on the initial user activity matrix includes:

identifying a field of an entry of the user activity matrix having no value;

in response to identifying the field of the entry having no value, performing a field value filling operation to produce a predicted value of the identified field of the entry based on a likelihood that the field takes the derived value for the entry, the predicted value being based on the model.

9. The method as in claim 8, wherein performing the field value filling operation includes:

for each of the fields, defining a plurality of categories based on possible values of that field;

generating a random forest of classification and regression trees (CARTs), each of the random forest of CARTs (i) being based on a bootstrap sample without replacement of the values of the plurality of fields and (ii) producing, as output, a category of the plurality of categories of the identified field corresponding to a leaf node of that CART occurring most frequently over a specified number of traversals of that CART; and producing, as the predicted value of the field for the entry, an average over the values defining the plurality of categories output by the random forest of the CARTs.

10. The method as in claim 1, wherein performing the transformation operation on the initial user activity matrix includes:

for each of the plurality of users, obtaining actual values of the plurality of the fields for that user;

generating an error metric between the actual values of the plurality of the fields for each of the plurality of users and predicted values of the plurality of the fields for each of the plurality of users, the predicted values being based on the model of the values of the initial plurality of fields;
in response to the error metric being greater than an error threshold, incrementing the current number of the plurality of additional fields; and
in response to the error metric being less than the error threshold, setting a number of the plurality of additional fields to be the current number of additional fields.

11. The method as in claim 10, wherein the error metric is a normalized root mean square error.

12. The method as in claim 1, wherein obtaining the user activity matrix having entries identifying a plurality of users includes:
performing a normalization operation on each of the values of the fields of each entry of the user activity matrix to produce, as the user activity matrix, a matrix with each row having values centered at an average value of that row and scaled with respect to a standard deviation of that row.

13. A computer program product comprising a nontransitory storage medium, the computer program product including code that, when executed by processing circuitry of a computer configured to identify unique users in a network, causes the processing circuitry to perform a method, the method comprising:
obtaining an initial user activity matrix, the initial user activity matrix having entries identifying a plurality of users, each of the entries having values of a respective, initial plurality of fields representing activity of a corresponding user of the plurality of users, the initial user activity matrix representing training data in which each entry includes an identity of a user of the plurality of users;
performing a transformation operation on the initial user activity matrix to produce a user activity matrix, the user activity matrix having values of a plurality of fields, the values of the plurality of fields including the values of the initial plurality of fields and values of a plurality of additional fields, the values of the plurality of additional fields being based on an application of a model of the values of the initial plurality of fields;
receiving a new user activity entry representing activity of a new user in the network, the user activity entry having values of the initial plurality of fields;
applying the model to the new user activity entry to produce a predicted new user activity entry; and
performing a comparison operation on the predicted new user activity entry and the user activity matrix to produce a comparison result, the comparison result indicating whether the new user is a user of the plurality of users.

14. A computer program product as in claim 13, wherein the method further comprises:
performing a compact singular value decomposition (SVD) of the user activity matrix to produce a first projection matrix and a second projection matrix;
performing a new user activity projection operation on the predicted new user activity entry and the first matrix factor to produce a projected user activity entry; and
performing, by the processing circuitry, a comparison operation on the projected user activity entry and each row of the second matrix factor to produce a comparison result, the comparison result indicating whether the new user is a user of the plurality of users.

15. The computer program product as in claim 14, performing the compact SVD of the user activity matrix includes:
performing a SVD of the user activity matrix to produce a first initial projection matrix, a second initial projection matrix, and an initial plurality of singular values;
generating a number of the initial plurality of singular values greater than a specified threshold; and
truncating a number of columns of the first initial projection matrix and the second initial projection matrix to produce, respectively, the first projection matrix and the second projection matrix, the number of columns of the first initial projection matrix and the second initial projection matrix truncated being equal to the number of the initial plurality of singular values greater than a specified threshold.

16. The computer program product as in claim 13, wherein performing the comparison operation on the predicted new user activity entry and the user activity matrix includes:
generating a relative error between the predicted new user activity entry and each row of the second matrix factor to produce a relative error array;
in response to the element of the relative error array having the smallest value being less than a specified tolerance, indicating that the new user is a user of the plurality of users; and
in response to the element of the relative error array having the smallest value being greater than the specified tolerance, indicating that the new user is not a user of the set of users in the network.

17. The computer program product as in claim 13, wherein performing a transformation operation on the initial user activity matrix includes:
setting the user activity matrix to be the initial user activity matrix;
generating, as a new column of the user activity matrix, a weighted average of the columns of the user activity matrix, the model being based on weights of the weighted average; and
appending the new column to the user activity matrix.

18. The computer program product as in claim 13, wherein performing the transformation operation on the initial user activity matrix includes:
identifying a field of an entry of the user activity matrix having no value;
in response to identifying the field of the entry having no value, performing a field value filling operation to produce a predicted value of the identified field of the entry based on a likelihood that the field takes the derived value for the entry, the predicted value being based on the model.

19. The computer program product as in claim 13, wherein performing the transformation operation on the initial user activity matrix includes:
for each of the plurality of users, obtaining actual values of the plurality of the fields for that user;
generating an error metric between the actual values of the plurality of the fields for each of the plurality of users and predicted values of the plurality of the fields for each of the plurality of users, the predicted values being based on the model of the values of the initial plurality of fields;
in response to the error metric being greater than an error threshold, incrementing the current number of the plurality of additional fields; and in response to the error metric being less than the error threshold, setting a number of the plurality of additional fields to be the current number of additional fields.

20. An electronic apparatus configured to identify unique users in a network, the electronic apparatus comprising:
a network interface;
a memory; and
controlling circuitry coupled to the memory, the controlling circuitry being configured to:
obtain an initial user activity matrix, the initial user activity matrix having entries identifying a plurality of users, each of the entries having values of a respective, initial plurality of fields representing activity of a corresponding user of the plurality of users, the initial user activity matrix representing training data in which each entry includes an identity of a user of the plurality of users;
perform a transformation operation on the initial user activity matrix to produce a user activity matrix, the user activity matrix having values of a plurality of fields, the values of the plurality of fields including the values of the initial plurality of fields and values of a plurality of additional fields, the values of the plurality of additional fields being based on an application of a model of the values of the initial plurality of fields;
receive a new user activity entry representing activity of a new user in the network, the user activity entry having values of the initial plurality of fields;
apply the model to the new user activity entry to produce a predicted new user activity entry; and
perform a comparison operation on the predicted new user activity entry and the user activity matrix to produce a comparison result, the comparison result indicating whether the new user is a user of the plurality of users.

* * * * *

UNITED STATES PATENT AND TRADEMARK OFFICE
CERTIFICATE OF CORRECTION

PATENT NO. : 10,037,417 B1
APPLICATION NO. : 15/727094
DATED : July 31, 2018
INVENTOR(S) : Modarresi Page 1 of 1

It is certified that error appears in the above-identified patent and that said Letters Patent is hereby corrected as shown below:

In Column 14, Line 7, Claim 4, delete "user does is" and insert -- user is --, therefor.

In Column 15, Line 55, Claim 14, delete "A computer" and insert -- The computer --, therefor.

Signed and Sealed this
Thirtieth Day of October, 2018

Andrei Iancu
*Director of the United States Patent and Trademark Office*